3,080,298
METHOD OF 9α-HYDROXYLATING STEROIDS

Pacifico A. Principe, New Brunswick, and Patrick A. Diassi, Westfield, N.J., assignors to Olin Mathieson Chemical Corporation, New York, N.Y., a corporation of Virginia
No Drawing. Filed June 29, 1961, Ser. No. 120,471
5 Claims. (Cl. 195—51)

This invention relates to an improved process for preparing 9α-hydroxy steroids by the enzymatic oxidation of steroids which are unsubstituted in the 9-position.

It is an object of this invention to provide an efficient method for obtaining 9α-hydroxy steroids. More particularly, it is an object of this invention to convert 9-unsubstituted steroids, preferably also unsubstituted in the 11-position, to the corresponding 9α-hydroxy steroids by the enzymatic oxidation of the steroidal starting material.

According to this invention, a 9-unsubstituted steroid, preferably with no 11-substituent, is subjected to the action of enzymes of a $\Delta^1$-dehydrogenating microorganism. Surprisingly, it has been found that the combination of enzymes which normally effect $\Delta^1$-dehydrogenation, results in the substitution of a 9α-hydroxyl group on the nucleus of the steroidal starting material, thereby effecting hydroxylation, where $\Delta^1$-dehydrogenation would have been expected. Moreover, this is accomplished in the absence of added dehydrogenation inhibitor and in a relatively short period of incubation. The important element in effecting this result is the use of a large amount of steroid substrate, compared to the amount conventionally used, i.e. at least about 0.5% by weight per 100 ml. of nutrient medium. It is also desirable to harvest the product in a relatively short time, i.e. after about 24 hours of incubation. This method permits the processing of larger amounts of material in shorter time with proportionately higher yields.

The hydroxylation of this invention can be effected either by including the steroidal starting material in an aerobic culture of microorganism; or by bringing together, in an aqueous medium, the steroidal substrate, air, and enzymes of non-proliferating cells of the microorganism.

In general, any $\Delta^1$-dehydrogenating microorganism can be employed for the 9α-hydroxylation of this invention. Among the microorganisms which are suitable can be named those of the genera Nocardia [e.g., the dehydrogenating species of group 1 (Bergey) exemplified by *Nocardia restrictus, Nocardia corralina, Nocardia coeliaca, Nocardia globerula* and *Nocardia aurentia*]; Corynebacterium (e.g., *Corynebacterium simplex* and *Corynebacterium hoagii*); Mycobacterium (e.g., *Mycobacterium rhodochrous*); Cylindrocarpon (e.g., *Cylindrocarpon radicola*); Pseudomonas (e.g., *Pseudomonas testosteroni*), and Bacterium (e.g. *Bacterium cyclo-oxydans*).

Any steroid which is unsubstituted in the 9-position, and preferably also unsubstituted in the 11-position, may be used as a starting material for the enzymatic process of this invention. Included among the steroids which are utilizable, are androstanes (including androstenes and androstadienes), pregnanes (including allopregnanes, pregnenes and pregnadienes); and cholestanes (including cholestenes and cholestadienes). Examples of suitable androstanes are testosterone, 19-nortestosterone, androstane-3,17-dione, $\Delta^4$-androstene-3,17-dione, 17α-methyltestosterone and 17α-methylandrostane-17β-ol-3-one. Among the suitable pregnanes are pregnane-21-ol-3,20-dione, 12α-methylprogesterone, pregnane-3,20-dione, pregnenolone, 16,17-oxidoprogesterone, $\Delta^{16}$-progesterone, 19-norprogesterone, 17α-hydroxyprogesterone, cortexolone, $\Delta^1$-cortexolone, $\Delta^1$-17α-hydroxyprogesterone, desoxycorticosterone, $\Delta^1$-desoxycorticosterone, 6α-methyldesoxycorticosterone, $\Delta^1$-6α-methyldesoxycorticosterone and 6α-fluorocortexolone. Particularly preferred are those steroids which contain in the A-ring the 3-keto-$\Delta^4$-configuration and are saturated in the 1,2-position.

In general the conditions for culturing the $\Delta^1$-dehydrogenating microorganisms for the purposes of this invention are, except for the inclusion of the steroid to be converted, the same as those for culturing organisms for the production of antibiotics, i.e., the microorganism is aerobically grown in contact with (in or on) a suitable fermentation medium. A suitable medium essentially comprises a source of nitrogenous factors and a source of carbon and energy. The latter may be a carbohydrate (such as sucrose, molasses, glucose, maltose, starch or dextrin), a fatty acid, a fat (such as soybean oil) and/or the steroid itself. Preferably, however, the medium includes an assimilable source of carbon and energy in addition to the steroid.

The source of nitrogenous factors may be organic (e.g., soybean meal, corn steep liquor, meat extract and/or distiller's solubles) or synthetic (i.e., composed of simple, synthesizable organic or inorganic compounds such as ammonium salts, alkali nitrates, amino acids or urea).

An adequate sterile-air supply should be maintained during fermentation, for example by the conventional methods of exposing a large surface of the medium to air or by utilizing submerged aerated culture. The steroid may be added to the culture during the incubation period or included in the medium prior to sterilization or inoculation.

In order to achieve the benefits of this invention, the concentration of the steroid in the culture must at least be 0.5% by weight of steroid substrate per 100 ml. of medium. This proportion may be as high as about 4%. 1% to 2% has been found to be the preferred range.

It has also been found preferable to harvest the product after a relatively short period of incubation. About 24 to 30 hours after the starting material has been added to the incubating culture, the hydroxylated product is preferably separated.

The process yields the 9α-hydroxy derivative of the steroid substrate which can then be converted to the corresponding 9(11)-dehydro steroid derivative. For this purpose, the 9α-hydroxy steroidal product can be treated with an equimolar amount of thionyl chloride in the presence of an organic base (e.g., pyridine and triethylamine) thereby yielding the corresponding 9(11)-dehydro derivative, which can be purified by conventional procedures such as fractional crystallization, chromatography or the like. The 9(11)-dehydro derivatives thus obtained are known to the art as starting materials for the preparation of physiologically active 9α-halo-11β-hydroxy steroids.

The following examples are illustrative of this invention. All temperatures are given in degrees centigrade.

EXAMPLE 1

9α-Hydroxyprogesterone

A. *Fermentation.*—Surface growth from a two-week old agar slant of *Nocardia restrictus* (Waksman Collection No. 545, Institute of Microbiology, New Brunswick, New Jersey), grown on Gould agar of the following composition:

| | Gms. |
|---|---|
| Agar | 20 |
| Glucose | 10 |
| Yeast extract | 2.5 |
| $K_2HPO_4$ | 1 |
| Distilled water, q.s. 1 liter. | |
| (Sterilized 15 minutes at 20 p.s.i.) | | is suspended in 5 ml. of an 0.85% saline solution. One ml. portions of this suspension are used to inoculate each of three 250 ml. Erlenmeyer flasks (F1 stage) each containing 50 ml. of the following medium (corn steep medium):

| | Gms. |
|---|---|
| Corn steep liquor | 6 |
| $NH_4H_2PO_4$ | 3 |
| $CaCO_3$ | 2.5 |
| Soybean oil | 2.2 |
| Yeast extract | 2.5 |
| Dextrose | 10 |

Distilled water, q.s. 1 liter.
pH 7.0 (sterilized for 15 minutes at 30 p.s.i.)

The flasks are incubated at 25° on a rotary shaker (280 cycles/min.-2" radius) for 21 hours, after which a 6% by volume transfer is made to each of eight 250 ml. Erlenmeyer flasks (F2 stage) containing 50 ml. of the medium used in the F1 stage. Simultaneously 250 mg. of progesterone are added to each flask by the addition of 0.5 ml./flask of a solution containing 500 mg. of progesterone per ml. of N,N-dimethylformamide, resulting in a final progesterone concentration of 0.5%. The F2 stage flasks are then incubated for an additional 24 hours under the conditions used in the incubation of the F1 stage flasks.

B. *Isolation.*—24 hours after the addition of the steroid substrate, 50 ml. of methyl isobutyl ketone are added to the fermented broth in each flask. The flasks are then placed on a rotary shaker as described above and extracted for one hour at 25°.

The methyl isobutyl ketone (400 ml.) is separated from the total fermentation broth (400 ml.) and the broth re-extracted with 400 ml., 200 ml. and 200 ml. portions of methyl isobutyl ketone. The combined extracts are washed twice with 400 ml. portions of water and evaporated to dryness, in vacuo. The residue (2.04 g.) is fractionally crystallized from acetone-hexane to give 350 mg. of 9α-hydroxyprogesterone, M.P. 188–190°; $[\alpha]_D^{22}$ +188 (chlf.);

$\lambda_{max}^{alc.}$ 242 m$\mu$ ($\epsilon$=15,100)

Concentration of the mother liquors gives 250 mg. of progesterone.

EXAMPLE 2

9α-Hydroxycortexolone

A. *Fermentation.*—1 ml. portions of inoculum obtained as described in Example 1 from a culture of *Nocardia restrictus* on Gould agar are used to inoculate each of three 250 ml. Erlenmeyer flasks (F1 stage) each containing 50 ml. of corn steep medium. The flasks are incubated at 25° on a rotary shaker (280 cycles per minute, 2 inch radius for 21 hours) after which time a 6% by volume transfer is made to each of four 250 ml. Erlenmeyer flasks containing 50 ml. of the medium used in the F1 stage. The flasks are simultaneously supplemented by the addition of 1.0 ml. per flask of a solution containing 250 mg. of cortexolone per ml. of N,N-dimethylformamide resulting in a final cortexolone concentration of 0.5% of broth. Incubation is continued for 28 hours under the conditions used in the incubation of the F1 stage flasks.

B. *Isolation.*—After the 28 hour incubation period, 50 ml. of methyl isobutyl ketone are added to each flask and the flasks are extracted for one hour at 25° on a rotary shaker as in Example 1. The methyl isobutyl ketone is separated from the fermentation broth and the broth is extracted twice again with 300 ml. of methyl isobutyl ketone. The combined extracts are washed three times with 200 ml. portions of water and evaporated to dryness, in vacuo. The residue (1.2 g.) is crystallized from acetone to give 220 mg. of 9α-hydroxycortexolone, M.P. 236–238°; $[\alpha]_D^{23}$ +103 (dioxane);

$\lambda_{max}^{alc.}$ 238 m$\mu$ ($\epsilon$=16,300); $\lambda_{max}^{Nujol}$ 2.90, 5.84, 6.10–6.13, 6.22$\mu$

*Analysis.*—Calc'd for $C_{21}H_{30}O_5$ (367.45): C, 69.58; H, 8.34. Found: C, 70.97; H, 8.86.

EXAMPLE 3

9α-Hydroxytestosterone

By following the procedure of Example 1 but substituting testosterone for the progesterone and using *Bacterium cyclo-oxydans* (ATCC 12673), 9α-hydroxytestosterone is obtained.

EXAMPLE 4

9α-Hydroxycortexolone

By following the procedure of Example 2 but substituting *Nocardia aurentia* (ATCC 12674) for *Nocardia restrictus*, 9α-hydroxycortexolone is obtained.

EXAMPLE 5

9α-Hydroxydesoxycorticosterone

By following the procedure of Example 1 but substituting desoxycorticosterone as the substrate and *Pseudomonas testosteroni* (ATCC 11996) as the organism, 9α-hydroxydesoxycorticosterone is obtained.

EXAMPLE 6

9α-Hydroxy-19-Norprogesterone

By following the procedure of Example 2 but substituting 19-norprogesterone as the substrate and *Cylindrocarpon radicicola* (ATCC 11011) as the organism, 9α-hydroxy-19-norprogesterone is obtained.

EXAMPLE 7

9α-Hydroxy-$\Delta^4$-Androstene-3,17-Dione

By following the procedure of Example 1 but substituting $\Delta^4$-androstene-3,17-dione as the substrate at a concentration of 1% and using *Cylindrocarpon radicicola* as the organism, 9α-hydroxy-$\Delta^4$-androstene-3,17-dione is obtained.

EXAMPLE 8

9α-Hydroxyprogesterone

By substituting *Corynebacterium simplex* as the organism in the procedure of Example 1, 9α-hydroxyprogesterone is obtained.

EXAMPLE 9

Preparation of 9(11)-Dehydroprogesterone

9α-hydroxyprogesterone (63 mg.) is dissolved in 1 ml. of pyridine and treated at room temperature with 0.03 ml. of thionyl chloride. After 10 minutes the solution is diluted with 10 ml. of water and the pyridine neutralized by the addition of an equivalent amount of hydrochloric acid. The resulting mixture is extracted with chloroform, the chloroform extract washed with water, dried over sodium sulfate and concentrated to dryness leaving about 75 mg. of residue which upon fractional crystallization from ethyl acetate-hexane, gives 9(11)-dehydroprogesterone, M.P. about 117–118°.

In the same manner, following the procedure of Example 9, 9α-hydroxytestosterone, 9α-hydroxycortexolone, 9α-hydroxydesoxycorticosterone, 9α-hydroxy-19-norprogesterone and 9α-hydroxy-$\Delta^4$-androstene-3,17-dione are converted to $\Delta^{4,9(11)}$-androstadiene-17β-ol-3-one, $\Delta^{4,9(11)}$-pregnadiene-17α,21-diol-3,20-dione, $\Delta^{4,9(11)}$-pregnadiene-21-ol-3,20-dione, 19-nor-9(11)-dehydroprogesterone and $\Delta^{4,9(11)}$-androstadiene-3,17-dione, respectively.

This invention may be variously otherwise embodied within the scope of the appended claims.

What is claimed is:

1. A process for 9α-hydroxylating steroids of the androstane, pregnane and cholestane series which comprises subjecting a 9-unsubstituted-steroid of said series in a concentration of at least 0.5% by weight of steroid per 100 ml. of nutrient medium to the action of enzymes of a $\Delta^1$-dehydrogenating microorganism selected from the genera consisting of Nocardia, Pseudomonas, Corynebacterium, Mycobacterium and Cylindrocarpon.

2. The process of claim 1 wherein the concentration of steroid is about 0.5% to 4% per 100 ml. of nutrient medium and the product is separated from the fermentation broth after about 24 to 30 hours of incubation.

3. The process for the preparation of 9α-hydroxyprogesterone which comprises subjecting 0.5% to 4% of progesterone per 100 ml. of nutrient medium under oxidizing conditions to the action of the enzymes of *Nocardia restrictus*.

4. The process for the preparation of 9α-hydroxycortexolone which comprises subjecting 0.5% to 4% of cortexolone per 100 ml. of nutrient medium under oxidizing conditions to the action of the enzymes of *Nocardia aurentia*.

5. The process of claim 4 wherein the concentration of cortexolone is 1% to 2% per 100 ml. of nutrient medium.

References Cited in the file of this patent

UNITED STATES PATENTS 2,880,205      Campbell et al. _____ Mar. 31, 1959

OTHER REFERENCES

Bergey's Manual of Determinative Bacteriology, 7th edition, The Williams and Wilkins Company, Baltimore, Maryland (1957), page 1018.

Prescott et al.: Industrial Microbiology, McGraw-Hill Book Company, Inc., New York (1959), page 749.